(12) United States Patent
Yoshimoto et al.

(10) Patent No.: US 11,508,018 B2
(45) Date of Patent: Nov. 22, 2022

(54) WORK INFORMATION MANAGEMENT SYSTEM AND WORK INFORMATION MANAGEMENT METHOD

(71) Applicant: Hitachi, Ltd., Tokyo (JP)

(72) Inventors: Hiroyuki Yoshimoto, Tokyo (JP); Noriyuki Haga, Tokyo (JP); Masayoshi Ishibashi, Tokyo (JP); Nobuyuki Sugii, Tokyo (JP)

(73) Assignee: HITACHI, LTD., Tokyo (JP)

( * ) Notice: Subject to any disclaimer, the term of this patent is extended or adjusted under 35 U.S.C. 154(b) by 93 days.

(21) Appl. No.: 16/970,717

(22) PCT Filed: Jul. 30, 2018

(86) PCT No.: PCT/JP2018/028441
§ 371 (c)(1),
(2) Date: Aug. 18, 2020

(87) PCT Pub. No.: WO2020/026299
PCT Pub. Date: Feb. 6, 2020

(65) Prior Publication Data
US 2021/0056646 A1 Feb. 25, 2021

(51) Int. Cl.
*G06Q 50/04* (2012.01)
*G16Y 10/25* (2020.01)
(Continued)

(52) U.S. Cl.
CPC ............. *G06Q 50/04* (2013.01); *G06F 1/163* (2013.01); *G16Y 10/25* (2020.01); *G16Y 40/50* (2020.01)

(58) Field of Classification Search
CPC ........ A41D 13/00; A61B 5/00; A61B 5/0022; B25B 23/14; G02B 27/0172;
(Continued)

(56) References Cited

U.S. PATENT DOCUMENTS 7,137,069 B2* 11/2006 Abbott ................... G06F 1/163
715/744
7,780,541 B2* 8/2010 Bauer ..................... G06F 1/163
473/202
(Continued)

FOREIGN PATENT DOCUMENTS

JP 2009-48581 A 3/2009
JP 2011-159204 A 8/2011
(Continued)

OTHER PUBLICATIONS

International Search Report of PCT/JP2018/028441 dated Aug. 28, 2018.
(Continued)

*Primary Examiner* — Stephen R Burgdorf
(74) *Attorney, Agent, or Firm* — Mattingly & Malur, PC

(57) ABSTRACT

The present invention comprises: a wearable sensor that is worn by a worker, the wearable sensor having a sensor that receives sensor data from a sensing object, and a transmitter that transmits to a terminal the sensor data received by the sensor; and a computer that determines operation content for the worker on the basis of the sensor data received from the wearable sensor, and outputs the result of the determination to a display unit.

6 Claims, 11 Drawing Sheets

(51) Int. Cl.
*G06F 1/16* (2006.01)
*G16Y 40/50* (2020.01)

(58) Field of Classification Search
CPC .... G05B 19/003; G05B 19/418; G05B 19/4183; G05B 2219/31027; G05B 2219/35464; G06F 1/163; G06F 3/011; G06F 3/014; G06F 3/147; G06F 19/3418; G06K 9/00671; G06K 9/00771; G06Q 10/063114; G06Q 10/0639; G06Q 10/087; G06Q 50/04; G06Q 50/08; G09B 19/00; G09B 19/003; G16Y 10/25; G16Y 40/50; Y02P 90/02; Y02P 90/30
USPC .................................................. 340/539.11
See application file for complete search history.

(56) References Cited

U.S. PATENT DOCUMENTS

| | | | | |
|---|---|---|---|---|
| 2002/0075232 A1* | 6/2002 | Daum | ............... | G06F 3/014 345/158 |
| 2005/0013416 A1* | 1/2005 | Lee | ............... | H04M 11/04 379/37 |
| 2008/0189827 A1 | 8/2008 | Bauer | | |
| 2012/0211560 A1* | 8/2012 | Su | ............... | G06Q 90/00 235/380 |
| 2016/0161301 A1* | 6/2016 | Guenther | ............... | A61B 5/6806 702/150 |
| 2016/0171864 A1* | 6/2016 | Ciaramelletti | ......... | A61B 5/1116 340/539.12 |
| 2017/0042454 A1* | 2/2017 | Schaffer | ............... | A61B 5/681 |
| 2017/0278051 A1 | 9/2017 | Cohn | | |
| 2017/0287360 A1* | 10/2017 | Subramaniam | ...... | G09B 21/006 |
| 2017/0337792 A1* | 11/2017 | Bermudez Rodriguez | ............... | G06K 7/10099 |
| 2018/0272209 A1* | 9/2018 | Shibuya | ............... | G06F 3/014 |
| 2018/0364804 A1* | 12/2018 | Hoen | ............... | G06F 3/014 |
| 2019/0087050 A1* | 3/2019 | Mani | ............... | G06F 3/0416 |
| 2019/0174284 A1* | 6/2019 | Gold | ............... | G06Q 30/0207 |
| 2019/0212844 A1* | 7/2019 | Leigh | ............... | G06F 3/04146 |
| 2019/0362243 A1 | 11/2019 | Matsumura et al. | | |

FOREIGN PATENT DOCUMENTS

| | | |
|---|---|---|
| JP | 6321879 B1 | 5/2018 |
| WO | 2018/076992 A1 | 5/2018 |

OTHER PUBLICATIONS

Extended European Search Report received in corresponding European Application No. 18928250.2 dated Feb. 8, 2022.

* cited by examiner

WORK INFORMATION MANAGEMENT SYSTEM AND WORK INFORMATION MANAGEMENT METHOD

INFORMATION MANAGEMENT METHOD

Technical Field

The present invention relates to a technique for managing work information of a worker.

Background Art

At an assembly work site in a manufacturing industry, it is important to reduce an occurrence of a failure and establish traceability for investigating a cause of the occurrence of a failure in an early stage. A matter for visualizing who performed what kind of work and when the work was performed can be used for the purpose of facilitating training of workers and improving work efficiency at the entire site. At a maintenance site or the like, a matter for associating a tool with a worker is effective in managing articles and recognizing a worker or a work state. When whether work has been performed correctly can be immediately fed back to a worker, quality can be improved and worker safety can be improved.

Under such a background, with the development of the Internet of Things (IoT) technique in recent years, a method for visualizing work information of a worker in many ways has been proposed, or the technique has been commercialized. In PTL 1, for example, a wrist band is worn on an arm of a worker who works in an inventory, and a sensor provided on a shelf where articles are stored is used to detect a movement of a hand of the worker.

Citation List

Patent Literature

PTL 1: US 20170278051

SUMMARY OF INVENTION

Technical Problem

At a work site or a production site, touching information between a body and the outside may be used in a workable factory in addition to the situation described above. For an article such as fruits that may be damaged by strong gripping, when pressing down a button of a machine or a sensing mechanism for holding the article without impairing the article is confirmed, or when a tool or the like is held in hand, a work state or a worker can be managed if it is possible to know how much strength should be used to hold what kind of tool or confirm that the article is held when the article has a characteristic shape.

It is difficult to acquire information on touching strength when touching the article with the body in such a manner or information of a surface concave-convex state by using the method disclosed in PTL 1 or from an image of a camera or the like. On the other hand, the information can be collected by, for example, wearing on the body a pressure sensor or a wearable object such as a piece of clothing to which the pressure sensor is attached. However, an article such as a tool generally has a unique shape or surface state, and it is difficult to determine what a touched object is like only from a sensor worn on the body.

An object of the invention is to provide a technique capable of performing work information management by associating a worker with a work content by the worker touching a sensing object via a wearable sensor.

Solution to Problem

The work information management system according to the invention preferably includes a wearable sensor including a sensor that is worn by a worker and receives sensor data from a sensing object and a transmitter that transmits the sensor data received by the sensor to a terminal, and a computer that determines a work content of the worker based on the sensor data received from the wearable sensor and outputs a determination result to a display unit.

The invention is also known as a work information management method performed by the work information management system described above.

Advantageous Effect

According to an aspect of the invention, work information can be managed by associating a worker with a work content by the worker touching a sensing object via a wearable sensor.

DESCRIPTION OF EMBODIMENTS

Figure 1:
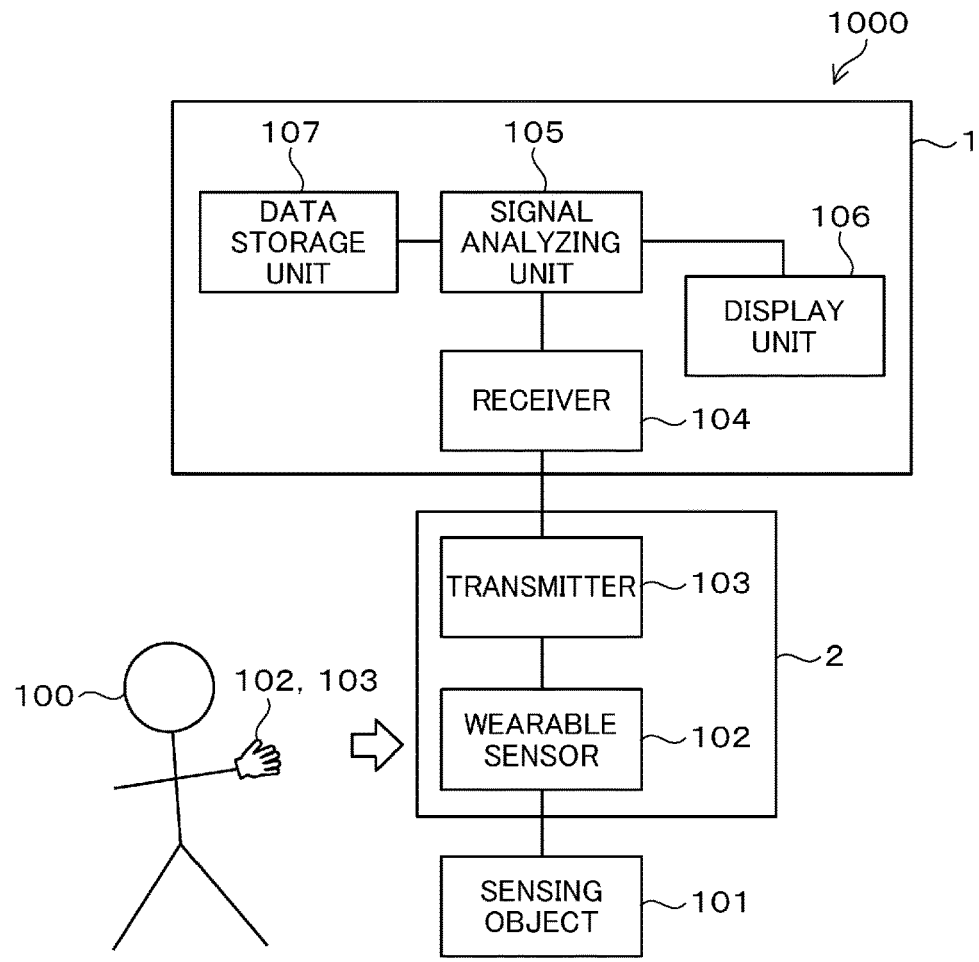
FIG. 1 shows a schematic configuration of a work information management system.

Hereinafter, embodiments will be described in detail with reference to the drawings. However, the invention should not be construed as being limited to the description of the embodiments described below. Those skilled in the art could easily understand that specific configurations can be changed without departing from the spirit or scope of the invention.

In configurations according to the invention described below, the same or similar functions are denoted by the same reference numerals in different drawings, and repetitive descriptions may be omitted.

In the present specification, expressions such as "first", "second", and "third" are used to identify components, and do not necessarily limit a number or an order. Numbers for identifying components may be used on a context basis, and a number used in one context may not necessarily indicate the same configuration in another context. A component identified by a certain number is not prevented from having a function of a component identified by another number.

In order to facilitate understanding of the invention, positions, sizes, shapes, ranges, or the like of each configuration shown in the drawings may not represent actual positions, sizes, shapes, ranges, and the like. Therefore, the invention is not necessarily limited to the positions, the sizes, the shapes, the ranges, and the like shown in the drawings.

Components described in a singular form in the present specification include components in a plural form unless specifically stated otherwise.

Although an application example of work in a manufacturing industry or at a maintenance site will be described in the following embodiments, the application of the invention is not necessarily limited thereto. Although an example of work performed by hands will be mainly described in the following embodiments, a wearable sensor included in the invention is not limited thereto. The wearable sensor may be worn on a part of a foot such as a sole of a foot and a knee, or a part of an arm such as a shoulder or an elbow. In the following embodiments, an example of a mechanism for a worker to acquire data by touching with a part of a body includes a pressure sensor that is mounted to a wearable sensor. The pressure sensor may have a plastic shape, or a cloth shape.

First Embodiment

The first embodiment will be described with reference to FIG. 1. A work information management system 1000 according to the first embodiment includes a terminal device 1 and a sensor device 2. The terminal device 1 includes a general computer as hardware, receives sensor data from the sensor device 2, and analyzes the sensor data. As shown in FIG. 1, the terminal device 1 includes a receiver 104, a signal analyzing unit 105, a display unit 106, and a data storage unit 107. The sensor device 2 includes, as hardware, an object (for example, a glove or a shoe provided with a pressure sensor) such as an appliance, a machine, a tool, or a device that is provided with a wearable sensor 102 and a transmitter 103. The sensor device 2 acquires sensor data from the wearable sensor 102, and the transmitter 103 transmits the sensor data to the terminal device 1. As shown in FIG. 1, the sensor device 2 includes the wearable sensor 102 and the transmitter 103.

The receiver 104 in the terminal device 1 includes a general communication device (for example, a network interface card (NIC)) as hardware, and receives the sensor data from the sensor device 2. The signal analyzing unit 105 includes a general arithmetic device (for example, a central processing unit (CPU)) as hardware. The signal analyzing unit 105 analyzes the sensor data, displays the sensor data and an analysis result of the sensor data on the display unit 106, and stores the sensor data and the analysis result of the sensor data in the data storage unit 107. The data storage unit 107 includes a general storage device (for example, a hard disk drive (HDD) or a solid state drive (SSD)) as hardware, and stores the analysis result of the sensor data from the signal analyzing unit 105. The display unit 106 includes a general display (for example, a liquid crystal display (LCD)) as hardware, and displays the analysis result of the sensor data from the signal analyzing unit 105.

The wearable sensor 102 has a glove shape or the like, and is a device that is internally provided with a sensing device. Alternatively, the wearable sensor 102 may have a cap shape worn on a fingertip, or a shape covering parts of a palm or a back of a hand. A worker 100 grips a sensing object 101 or touches a surface of the sensing object 101 with a tip of a hand, or presses the sensing object 101 with a part of the hand, so that the wearable sensor 102 provided in the sensor device 2 obtains sensor data. The sensing object 101 may be a tool, an electric machine, or the like used by the worker 100 during working. Alternatively, the sensing object 101 may be a conveying object such as a trolley or food such as fruits. In addition to a sensor that senses an object by touching the object, the wearable sensor 102 may include a sensor such as a sound sensor, a vibration sensor, and a magnetic sensor at the same time. The transmitter 103 may be integrally formed in the wearable sensor 102. The transmitter 103 may be provided in the wearable sensor 102 through a wire for transferring power or an electrical signal.

The receiver 104 receives an electrical signal including sensor data that is wirelessly transmitted from the transmitter 103. The signal analyzing unit 105 reads, from the received electrical signal, the sensor data of the sensing object 101 taken by the worker 100 in hand or touched by the worker 100 with hand, and determines a work content of the worker such as how the worker 100 touches the sensing object 101.

Figure 2:
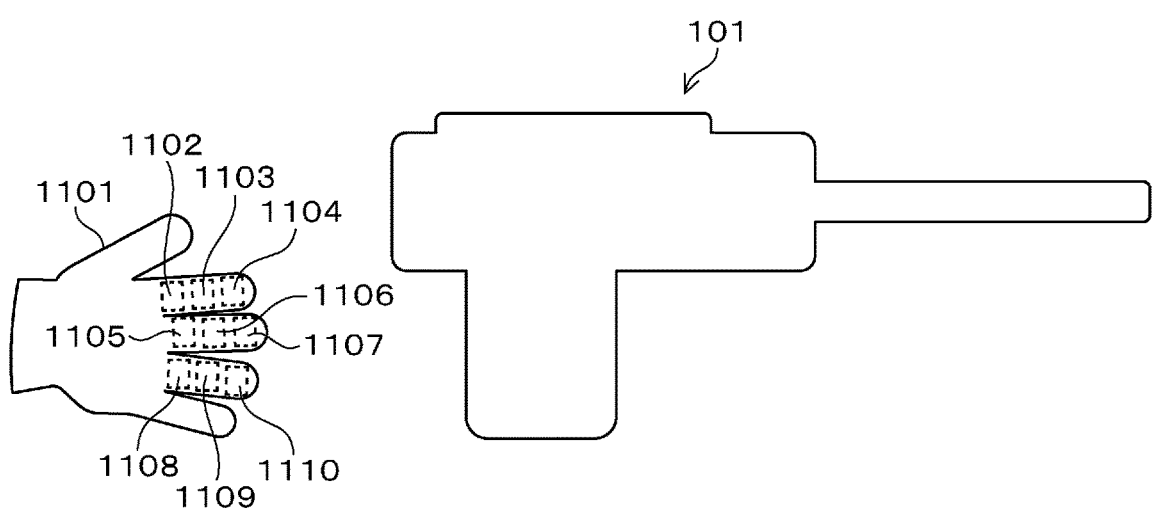
FIG. 2 shows a configuration example of a sensor device and a sensing object when a signal analyzing unit analyzes sensor data.
Figure 3:
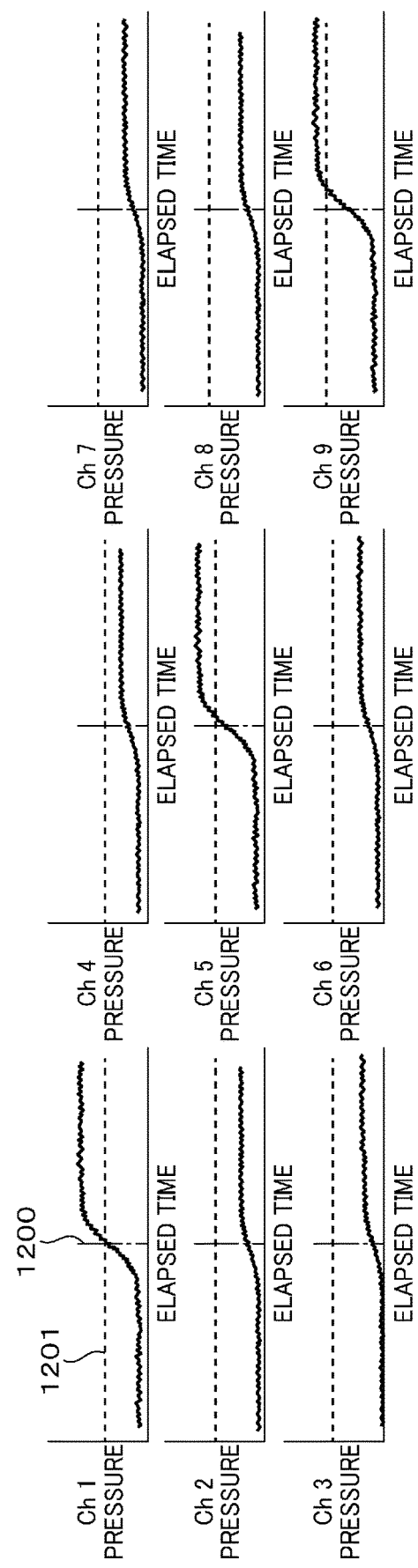
FIG. 3 shows an example of the sensor data.

FIG. 2 shows a configuration example of the sensor device and the sensing object when the signal analyzing unit 105 analyzes the sensor data. FIG. 3 shows an example of the sensor data analyzed by the signal analyzing unit 105.

As shown in FIG. 2, the wearable sensor 102 in the sensor device 2 is a glove-shaped wearable sensor 1101 that can be worn on a hand of the worker 100, and includes one or plural sensors provided at one or plural parts where the worker 100 touches the sensing object 101. The glove-shaped wearable sensor 1101 includes an index finger base pressure sensor 1102 (ch 1), an index finger central pressure sensor 1103 (ch 2), an index finger tip pressure sensor 1104 (ch 3), a middle finger base pressure sensor 1105 (ch 4), a middle finger central pressure sensor 1106 (ch 5), a middle finger tip pressure sensor 1107 (ch 6), a ring finger base pressure sensor 1108 (ch 7), a ring finger central pressure sensor 1109 (ch 8), and a ring finger tip pressure sensor 1110 (ch 9). The sensing object 101 is an electric tool or the like held by the worker 100 when cutting a work material.

In such a configuration, the sensor device 2 reads a pressure signal detected by a pressure sensor in each part of the wearable sensor 1101, and transmits information serving as sensor data to the terminal device 1 via the transmitter 103. The sensor data includes a pressure value, identification information for identifying the wearable sensor 1101 and a pressure sensor, and a time point when the pressure value is detected.

FIG. 3 shows an example of the sensor data. As shown in FIG. 3, information in the sensor data indicates a temporal transition of pressure values included in detection signals detected by the wearable sensor. The information is transmitted to each wearable sensor. FIG. 3 shows that the index finger base pressure sensor 1102 (ch 1), the middle finger central pressure sensor 1106 (ch 5), the ring finger tip pressure sensor 1110 (ch 9), and the like detected pressure exceeding a predetermined threshold 1201 used in pressure evaluation at a time point 1200 indicating a moment when the worker 100 holds a tool. Although pressure values of the other pressure sensors increase at the time point 1200 indicating a moment when the worker 100 holds a tool, the pressure values do not exceed the threshold 1201. Therefore, the signal analyzing unit 105 determines that the sensing object 101 is gripped by an index finger base, a middle finger center, and a ring finger tip as a work content of the worker 100, and outputs the determination result as an analysis result. For example, the signal analyzing unit 105 outputs to the display unit 106 a message indicating that the sensing object 101 is gripped by the index finger base, the middle finger center, and the ring finger tip, pressure values when the sensing object 101 is gripped, and a time point. At this time, the signal analyzing unit 105 may compare the above-described sensor data used when determining the work content with reference sensor data that defines a criterion to be satisfied in the work, determine whether the sensor data satisfies the reference sensor data, and output a determination result and an analysis result to the display unit 106. The reference sensor data may be pre-stored in the data storage unit 107 on a work basis. With such a configuration, an administrator can easily determine what kind of work state the worker is in, what kind of work content is performed, and whether the work content satisfies a criterion.

The sensor data obtained by touching may not be a pressure value and may be, for example, a level indicating a strength at which the sensing object 101 is touched by the wearable sensor 120. Alternatively, the sensor data may be a change rate of a touching strength indicating how the touching strength changes within a certain period of time.

The display unit 106 may be provided in the sensor device 2 and may be implemented to be directly visible to the worker 100. Alternatively, the display unit 106 may include a monitor that is checked by another person such as an administrator at a position away from the worker 100 or checked by both the administrator and the worker 100. The signal analyzing unit 105 may transmit an analysis result to the monitor via wireless communication to display the analysis result. A content displayed as the analysis result may relate to sensor data in real time when the worker 100 works. Alternatively, the content displayed as the analysis result may be a result obtained by comparing the sensor data in real time when the worker 100 works with sensor data of previous work, or a result obtained by analyzing the previous work. In this case, a change in a degree of proficiency of the worker or the like can be known by comparing sensor data during current work of the worker 100 with sensor data during previous work of the worker 100.

The display unit 106 may only display visual information, or may display a combination of tactile information such as sound and vibration and visual information. In addition, the display unit 106 may only display tactile information instead of visual information, or may display information obtained by the worker or a person other than the worker. The same may be applied to the second and subsequent embodiments.

When there are a plurality of workers, the data storage unit 107 stores sensor data of the sensing object 101 touched by each worker 100 for each part of the wearable sensor 102. The data storage unit 107 stores work data of a working object serving as the sensing object 101 corresponding to the sensor data. The work data includes time spent on the work, a date and time when the work is performed, a worker ID for identifying the worker 100, and the like. The IC chip provided in the wearable sensor 102 of the sensor device 2 transmits the time spent on the work, the date and time when the work is performed, and the worker ID to the terminal device 1 as the work data. For example, the IC chip counts a period of time from a time point when the wearable sensor 102 detects pressure up to a time point when the wearable sensor 102 detects no pressure. The period of time may serve as the time spent on the work. The IC chip reads a current time point counted by a timer (not shown). The current time point may serve as the date and time when the work is performed. The worker ID may be a worker ID obtained by the IC chip reading a worker ID pre-stored in a memory (not shown) of the worker 100 who uses the sensor device 2.

Data stored in the data storage unit 107 may be the sensor data received by the receiver 104 of the terminal device 1, or an analysis result of the signal analyzing unit 105, or both the analysis result and the sensor data. The data storage unit 107 may temporarily store real-time sensor data received from the sensor device 2 by the receiver 104 at any time, or may continue storing previous sensor data. The data storage unit 107 may store data in an electronic medium, or may print data on a printing medium.

As described above, the work information management system according to the present embodiment includes the sensor device 2 and the terminal device 1. The sensor device 2 includes a sensor that is worn by a worker and receives sensor data from the sensing object 101, and the wearable sensor 102 that includes the transmitter 103 that transmits the sensor data received from the sensor to the terminal device 1. The terminal device 1 determines a work content of the worker based on the sensor data received from the wearable sensor 102 and outputs the determination result to the display unit 106. Accordingly, the work content of the worker can be easily known using the sensor device 2.

In such a work information management system, work information of the worker can be associated with a working object by using the sensor data and the work data, and a work history and a work content, for example, when and where the worker performs what kind of work, can be managed. That is, work on a working object can be detected or estimated by a worker touching the working object, and work information can be managed by associating the worker with a work content according to the detection or estimation.

For example, a supervisor of the worker 100 may use the sensor device 2 to touch the sensing object 101, and sensor data indicating a correct touching manner of the sensing object 101 may be stored in the data storage unit 107 in advance as a model. Then, the signal analyzing unit 105 compares sensor data obtained when the worker 100 works with the model to determine a deviation degree between the sensor data and the model, and displays an analysis result on the display unit 106, so that a correct using manner of the sensing object 101 can be taught to the worker 100. For example, when a value of the index finger base pressure sensor 1102 (ch 1) included in the sensor data received from the sensor device 2 is smaller than a correct value of the index finger base pressure sensor included in the sensor data indicating the correct touching manner by a predetermined value, the signal analyzing unit 105 displays, on the display unit 106, an advice message such as "a holding manner of the index finger is weak, please hold a litter stronger".

Second Embodiment

Figure 4:
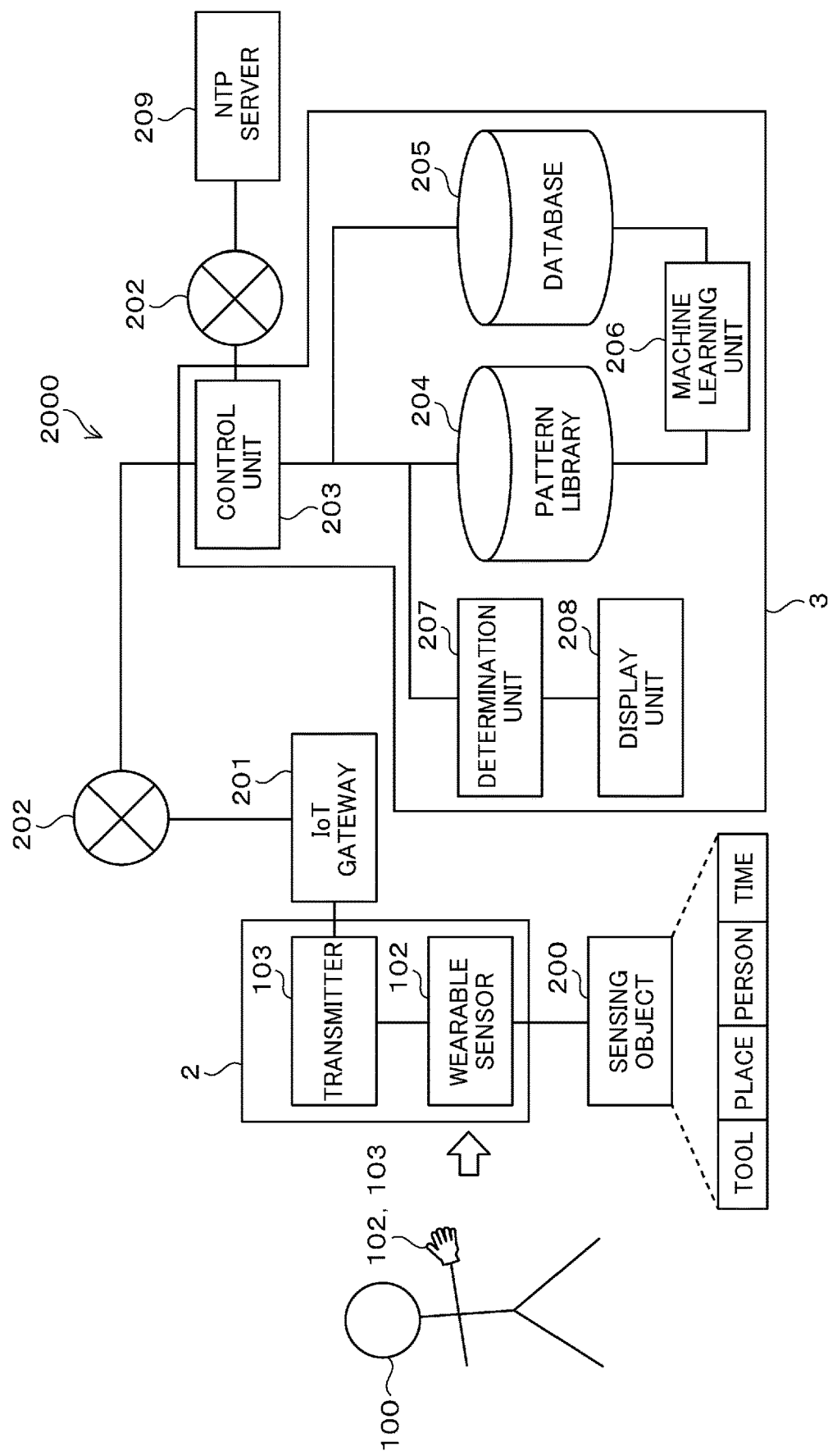
FIG. 4 shows a system configuration example of a work information management system.

The second embodiment will be described with reference to FIG. 4. A work information management system 2000 according to the second embodiment has a more specific device configuration than the work information management system 100 according to the first embodiment. The work management system 2000 includes the sensor device 2 the same as the sensor device in the first embodiment, an IoT gateway 201, and a server 3. Compared with the sensing object 100 according to the first embodiment, a sensing object 200 is implemented by an object (for example, a tool that can store information and count time) that can obtain work data such as sensing object identification information (ID), ID indicating an installation place of the sensing object, a user of the sensing object, and time when the sensing object is operated. Work data according to the present embodiment may include the work data according to the first embodiment.

The IoT gateway 201 includes a general communication computer (for example, a gateway server) as hardware, and performs data shaping to transmit a wireless signal including sensor data transmitted from the transmitter 103 to a network 202.

The server 3 includes a general computer as hardware, receives the sensor data and the work data transmitted from the IoT gateway 201 via the network 202, and performs machine learning. As shown in FIG. 4, the server 3 includes a control unit 203, a pattern library 204, a database 205, a machine learning unit 206, a determination unit 207, and a display unit 208.

The control unit 203, the machine learning unit 206, and the determination unit 207 include a CPU or the like as hardware, and control operation of each unit of the server 3 such as storing, in the database 205, the sensor data and the work data received from the sensor device 2 via the network 202. The pattern library 204 includes, as hardware, a database stored in a storage device such as an HDD and an SSD, and uses the sensor data and the work data to store a work content or a determination criterion for determining the sensing object 200 as a library.

Processing performed by the control unit 203, the machine learning unit 206, and the determination unit 207 is implemented by reading a program stored in a read only memory (ROM) (not shown) and loading the program into a random access memory (RAM) (not shown) to execute the program. The program may be downloaded from a network, loaded into a memory, and then executed. Alternatively, the program may be directly loaded into a memory from a portable computer-readable storage medium such as a compact disk (CD) and a digital versatile disk (DVD) via a reading and writing device that reads information from and writes information into the storage medium, and then the program is executed. The program may be provided or distributed by being recorded in the storage medium in a file format that can be installed or executed on a computer. The program may be provided or distributed by being stored in a computer connected to a communication network and downloaded via a network. The same may be applied to other embodiments.

The database 205 is stored in a storage device such as an HDD or an SSD as hardware, and stores the sensor data and the work data transmitted from the IoT gateway 201. Since a data content stored in the database 205 is the same as a data content stored in the data storage unit 107 according to the first embodiment, a description of the data content will be omitted.

The machine learning unit 206 performs machine learning by collating previous data stored in the database 205 with latest sensor data and work data received from the sensor device 2 at any time, and stores a learning result in the pattern library 204 as the latest sensor data and work data.

Figure 5:
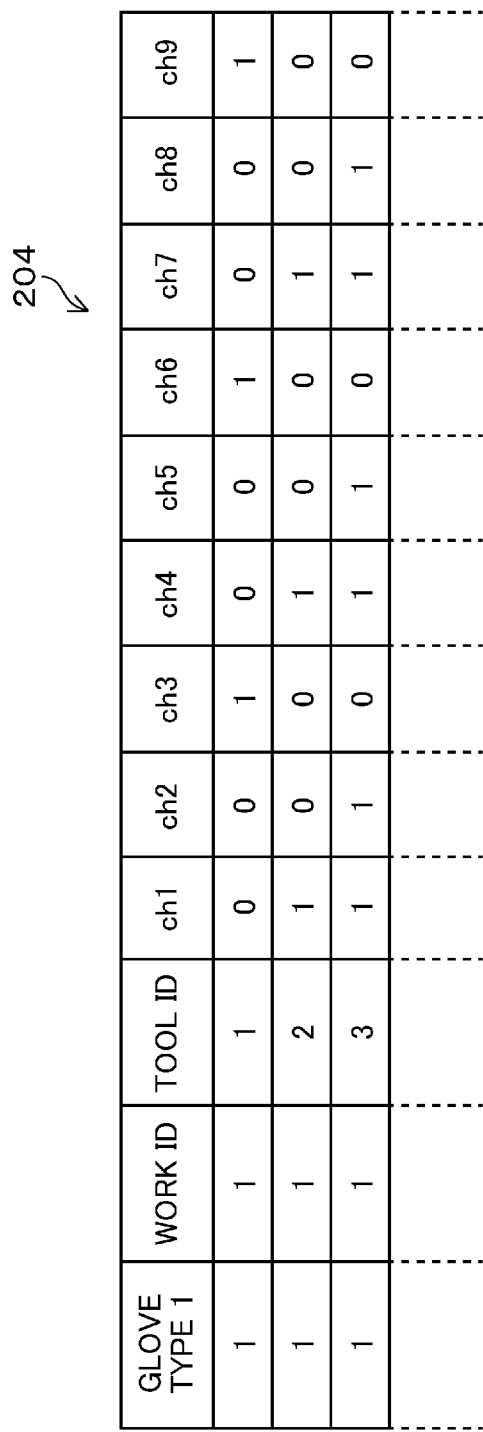
FIG. 5 shows an example of a pattern library.

FIG. 5 shows an example of the pattern library 204. In FIG. 5, a type serving as identification information of the wearable sensor 102 provided in the sensor device 2, a tool ID serving as identification information of a tool touched by the wearable sensor 102 of this type, a work ID serving as identification information of work using the tool, and a value of each part of the wearable sensor 102 are stored in association on a work order basis. In FIG. 5, for example, it can be seen that identification information "type 1" of the glove-shaped wearable sensor 1101 serving as the wearable sensor 102, a work ID "1" of work using the sensor, and tool IDs "1", "2" and "3" of tools that serve as the sensing object 200 used in the work are associated with a value of each part of the wearable sensor 1101 when the tools are used. In this example, three tools (tool IDs "1", "2", and "3") are required when the work having the work ID "1" is performed. When the work is performed using the tool having the tool ID "1", three sensors, that is, the index finger tip pressure sensor 1103 (ch 3), the middle finger tip pressure sensor 1106 (ch 6), and the ring finger tip pressure sensor 1110 (ch 9), must have detected a pressure equal to or larger than the threshold 1201. When the work is performed using the tool having the tool ID "2", three sensors, that is, the index finger base pressure sensor 1102 (ch 1), the middle finger base pressure sensor 1105 (ch 4), and the ring finger base pressure sensor 1108 (ch 7), must have detected a pressure equal to or larger than the threshold 1201. When the work is performed using the tool having the tool ID "3", six sensors, that is, the index finger base pressure sensor 1102 (ch 1), the index finger central pressure sensor 1103 (ch 2), the middle finger base pressure sensor 1105 (ch 4), the middle finger central pressure sensor 1106 (ch 5), the ring finger base pressure sensor 1108 (ch 7), and the ring finger central pressure sensor 1109 (ch 8), must have detected a pressure equal to or larger than the threshold 1201.

In this manner, the pattern library 204 stores, for each wearable sensor and each work serving as a detection target, a pattern indicating a value of each sensor when a piece of work is performed using a wearable sensor. The determination unit 207 compares the sensor data and the work data received from the sensor device 2 with data in the pattern library 204 and determines whether a value of each sensor included in the sensor data and the work data matches a value stored in the pattern library 204. Then, the determination unit 207 reads identification information (for example, "type 1") of a wearable sensor whose value is determined to be matched with the value stored in the pattern library 204, a work name (for example, a work name "component mounting" corresponding to the ID "1") of work using the sensor, and tool names (for example, "electric jigsaw", "electric drill", and "electric screwdriver" corresponding to IDs "1", "2", and "3") of tools serving as sensing objects used in the work, and determines, as a work content, that component mounting work is performed using these tools. The determination unit 207 displays the determination result on the display unit 208. Although a case is described above in which the determination unit 207 determines that a value of each sensor included in the sensor data and the work data matches a value stored in the pattern library 204, the invention is not limited thereto. The determination unit 207 may select data having a closest value.

The sensor data and the work data obtained from the sensing object 200 include the tool identification information (ID), the ID indicating an installation place of the tool, the user of the tool, the time when the tool is operated, and the like. Information such as the tool ID, the ID indicating an installation place of the tool, and the user of the tool is pre-stored in a memory of the tool, and the time when the tool is operated is counted by a timer inside the tool. The information may be transmitted from the tool via wireless communication and received by the sensor device 2, or the sensor device 2 may directly read the information.

An NTP server 2071 is provided in the work information management system 2000, and is connected to the server 3 via the network 202. The control unit 203 matches work time included in the sensor data and the work data with time information obtained from the NTP server 209, and stores the work time in the database 205. The determination unit 207 determines whether work is normally performed when the work data collated in the pattern library 204 is transmitted. In a case in which the work is determined to be normal or not normal, for example, when a deviation degree between a value of each sensor included in the sensor data and the work data at the time of performing actual work and the data stored in the pattern library is equal to or larger than a certain value (for example, when a sensor value in a first step at the time of performing certain work matches the data stored in the pattern library while a sensor value in a subsequent step cannot be obtained), the determination unit 207 determines that an error occurs in the work performed in the subsequent step and outputs to the display unit 208 a fact that the work in the subsequent step is abnormal as a determination result. Similar to the first embodiment, the determination unit 207 may display an advice message on the display unit 208.

In the second and subsequent embodiments, the IoT gateway 201 may be directly connected with the server 203 instead of being connected via the network 202.

As described above, the wearable sensor 102 acquires, from the sensing object 200, work data including identification information of the sensing object 200, a place of the sensing object, a user of the sensing object, and time when the sensing object is operated, and transmits the acquired work data and sensor data to the server 3 in the present embodiment. The server 3 determines a work content of the worker based on the sensor data and the work data received from the wearable sensor 102 and the pattern library 204 indicating a pattern of sensor values stored for each wearable sensor 102 and each work. With such a work information management system, a worker and work can be managed by obtaining identification information of a tool, a person, a place, time or the like from the sensor data and the work data, for example, from the sensing object 200, and associating the identification information with each other.

The server 3 performs machine learning based on previous sensor data and work data received from the wearable sensor 102 and latest sensor data and work data, and sets a result of the machine learning as a new pattern library 204. Accordingly, accuracy of data held by the pattern library 204 can be improved.

Third Embodiment

Figure 6:
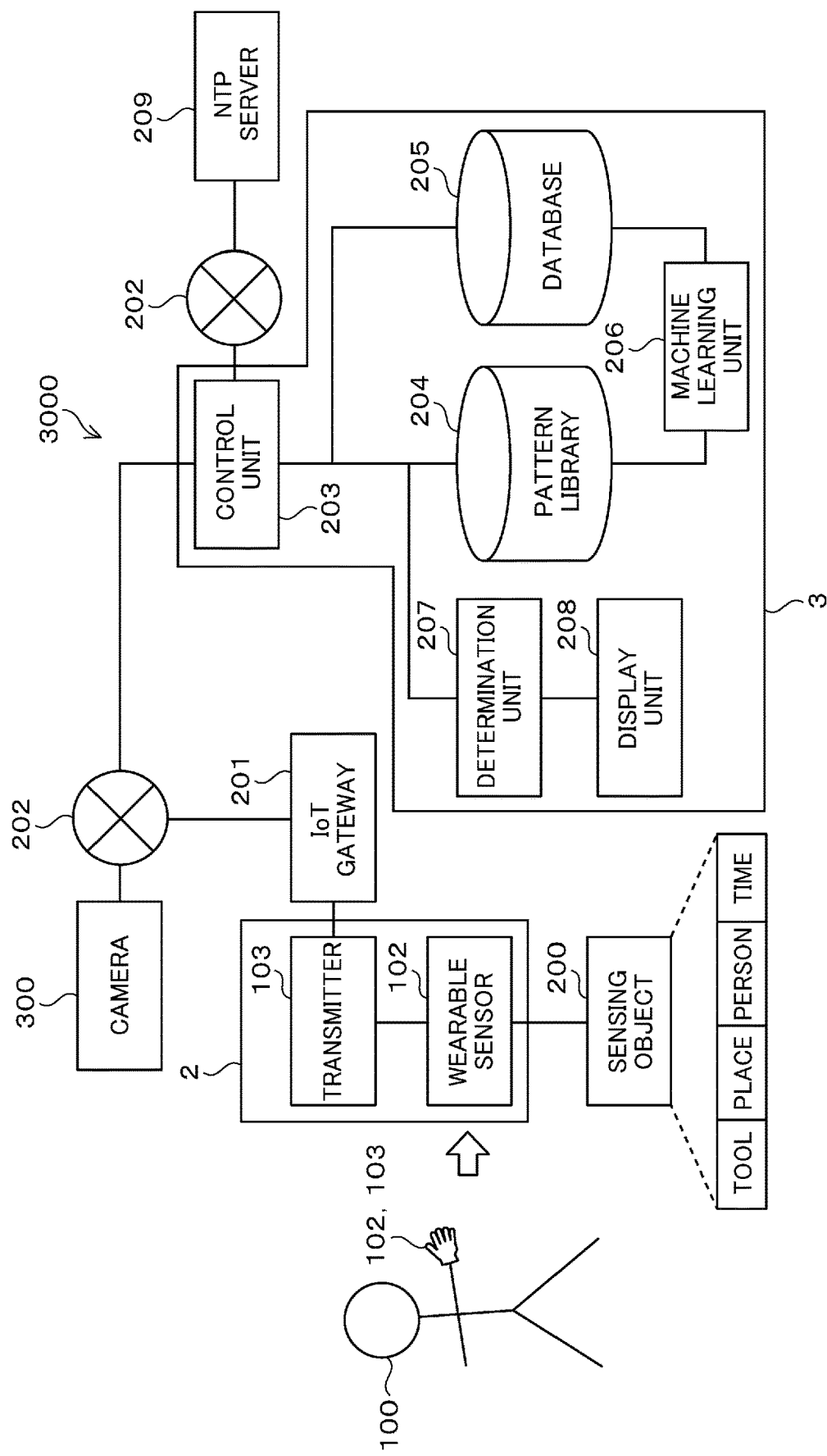
FIG. 6 shows a system configuration example of a work information management system in cooperation with a camera.

As shown in FIG. 6, a work information management system 3000 according to the third embodiment is different from the work information management system 2000 according to the second embodiment in that the work information management system 3000 further includes a camera 300 which is a network camera connected via the network 202. The camera 300 may be a stationary camera installed in a workshop, or may be worn on the body of the worker 100. Alternatively, the camera 300 may be integrally formed with the wearable sensor 102. The camera 300 captures an image of the worker 100 who works in a workshop, and transmits to the server 3 image data in which the captured image is associated with identification information (ID) of a workshop which is a capturing place and where the camera 300 is installed and identification information (ID) of the camera. A workshop ID and an ID indicating an installation place of a tool are associated with each other in advance to determine which tool is installed in which workshop.

When the control unit 203 of the server 3 receives the image data from the camera 300, the control unit 203 stores the image data in the database 205. For example, the control unit 203 searches the database 205 for an ID indicating an installation place of a tool that has the same ID as a workshop ID included in the image data, and associates the searched sensor data and work data with the image data received from the camera 300.

As described above, the work information management system 3000 according to the present embodiment includes the network camera 300 that captures an image of the worker. The camera 300 transmits to the server 3 image data in which the captured image of the worker, identification information indicating a capturing place, and identification information of the camera 300 are associated with each other. The server associates work data with the image data based on identification information indicating a place included in the image data received from the camera 300 and a place of the sensing object 101 included in the work data.

With such a configuration, visual information in addition to the sensor data and the work data obtained by the wearable sensor 102 can be collected from the camera 300. A worker and work can be managed more accurately by using data obtained from the wearable sensor 102 and data obtained from the camera 300 as complementary information.

Fourth Embodiment

Figure 7:
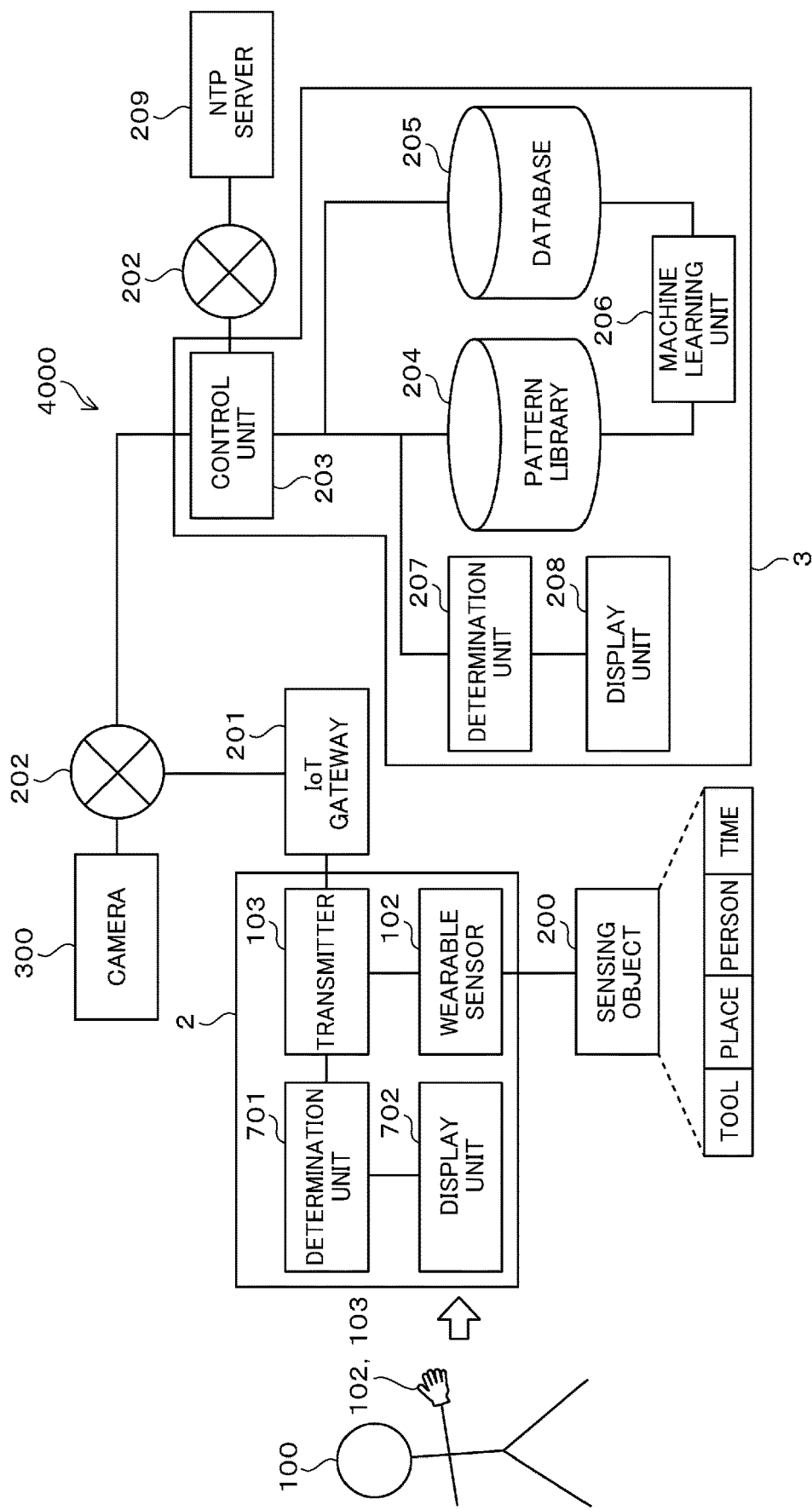
FIG. 7 shows a system configuration example of a work information management system using a wearable sensor including a determination unit and a display unit.

As shown in FIG. 7, a work information management system 4000 according to the fourth embodiment includes, in the sensor device 2, a determination unit 701 and a display unit 702 having the same functions as the determination unit 207 and the display unit 208 shown in FIG. 5 according to the second or third embodiment. Similar to the first embodiment, the display unit 702 may be integrally formed with the wearable sensor, or may be separated from the wearable sensor and connected to the wearable sensor by a wire.

The transmitter 103 of the sensor device 2 transmits sensor data and work data to the server 3 via the IoT gateway 201, and outputs the sensor data and the work data to the determination unit 701. When the determination unit 701 receives the sensor data and the work data from the transmitter 103, similar to the determination unit 207, the determination unit 701 compares the sensor data and the work data with a library that is similar to the pattern library 204 that is stored in a memory in the sensor device 2 in advance, and determines whether the sensor data and the work data match the library. When the sensor data and work data is determined to be matched with the library, the determination unit 701 reads identification information (for example, "type 1") of the wearable sensor, a work name (for example, a work name "component mounting" corresponding to the ID "1") of work using the sensor, and tool names (for example, "electric jigsaw", "electric drill", and "electric screwdriver" corresponding to the IDs "1", "2", and "3") of tools serving as sensing objects used in the work, and determines whether component mounting work is performed using these tools. The determination unit 701 displays the determination result on the display unit 702. Similar to the first embodiment, the determination unit 701 may display an advice message on the display unit 702.

The determination unit 701 and the display unit 702 may be provided at a place other than the worker 100. For example, the determination unit 701 and the display unit 702 may be configured such that an administrator other than the worker 100 can visually recognize a work content. The determination unit 701 may have a function different from a function of the determination unit 207 in order to transmit different information to the administrator and the worker. As a system configuration, a determination result of the determination unit 207 may be directly transmitted to and displayed on the display unit 208. Accordingly, the worker 100 can check their own work state information in real time.

Fifth Embodiment

Figure 8:
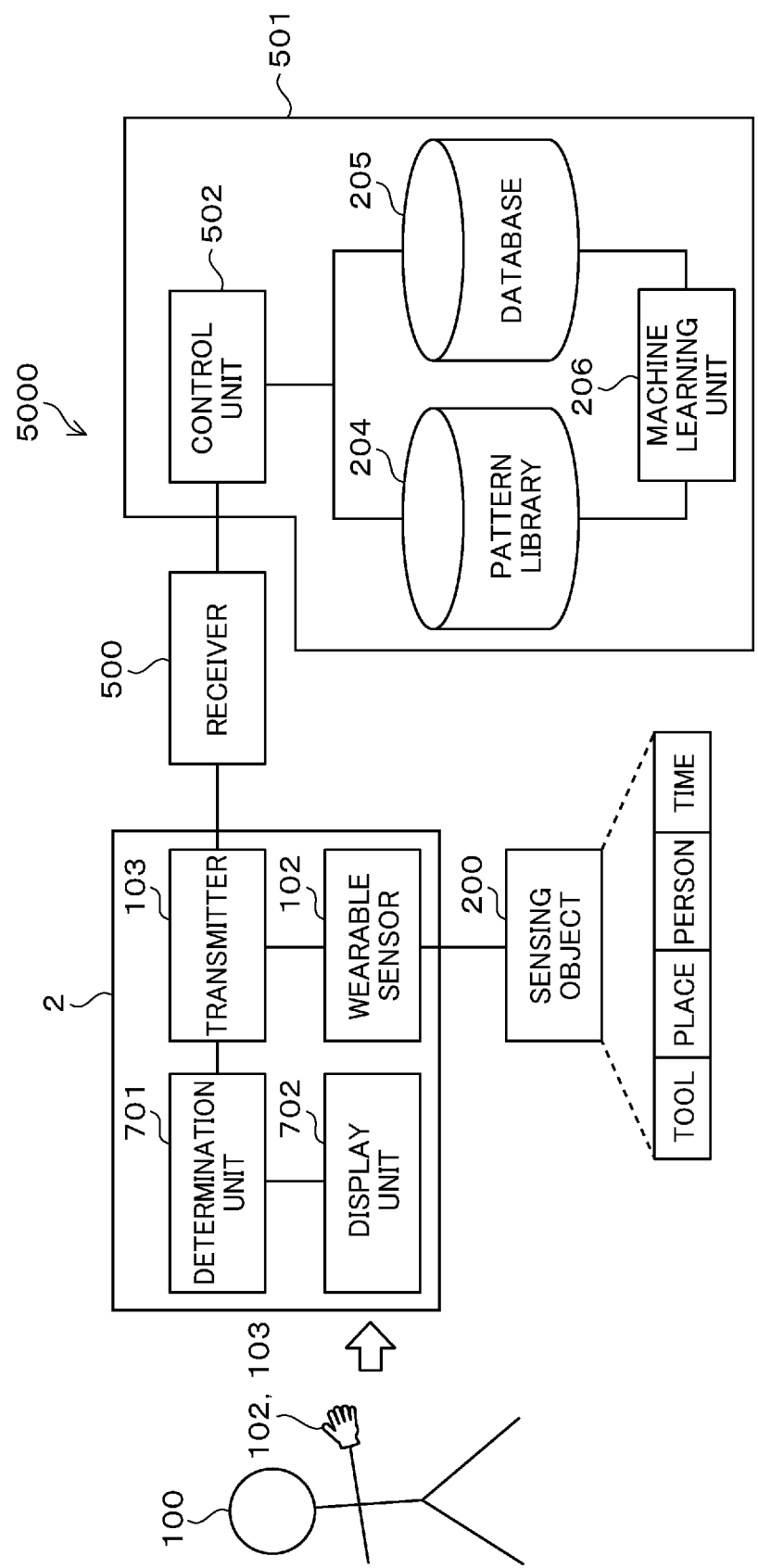
FIG. 8 shows a system configuration example of a work information management system including a wearable sensor and a single PC.

The fifth embodiment will be described with reference to FIG. 8. Different from the second to fourth embodiments, a work information management system 5000 according to the fifth embodiment does not include the server 3 or the IoT gateway 201. Instead, data is transmitted from the transmitter 103 to a control unit 502 of a personal computer (PC) 501 via a receiver 500. The receiver 500 includes a general communication device as hardware, and may be a modem, a NIC integrally formed with the PC 501, or the like. The control unit 502 has the same configuration as the configuration of the control unit 203 of the server 3 shown in FIG. 4.

Similar to the server 3, the PC 501 stores sensor data and work data in the database 205. On the other hand, similar to the fourth embodiment, the determination unit 701 provided in the sensor device 2 compares the sensor data and the work data received from the transmitter 103 of the sensor device 2 with a library that is similar to the pattern library 204 that is stored in a memory in the sensor device 2 in advance, determines whether the sensor data and the work data match the library, and outputs the determination result. With such a configuration, a worker and work can be managed using a small-scale electronic device or a small investment.

Sixth Embodiment

Figure 9:
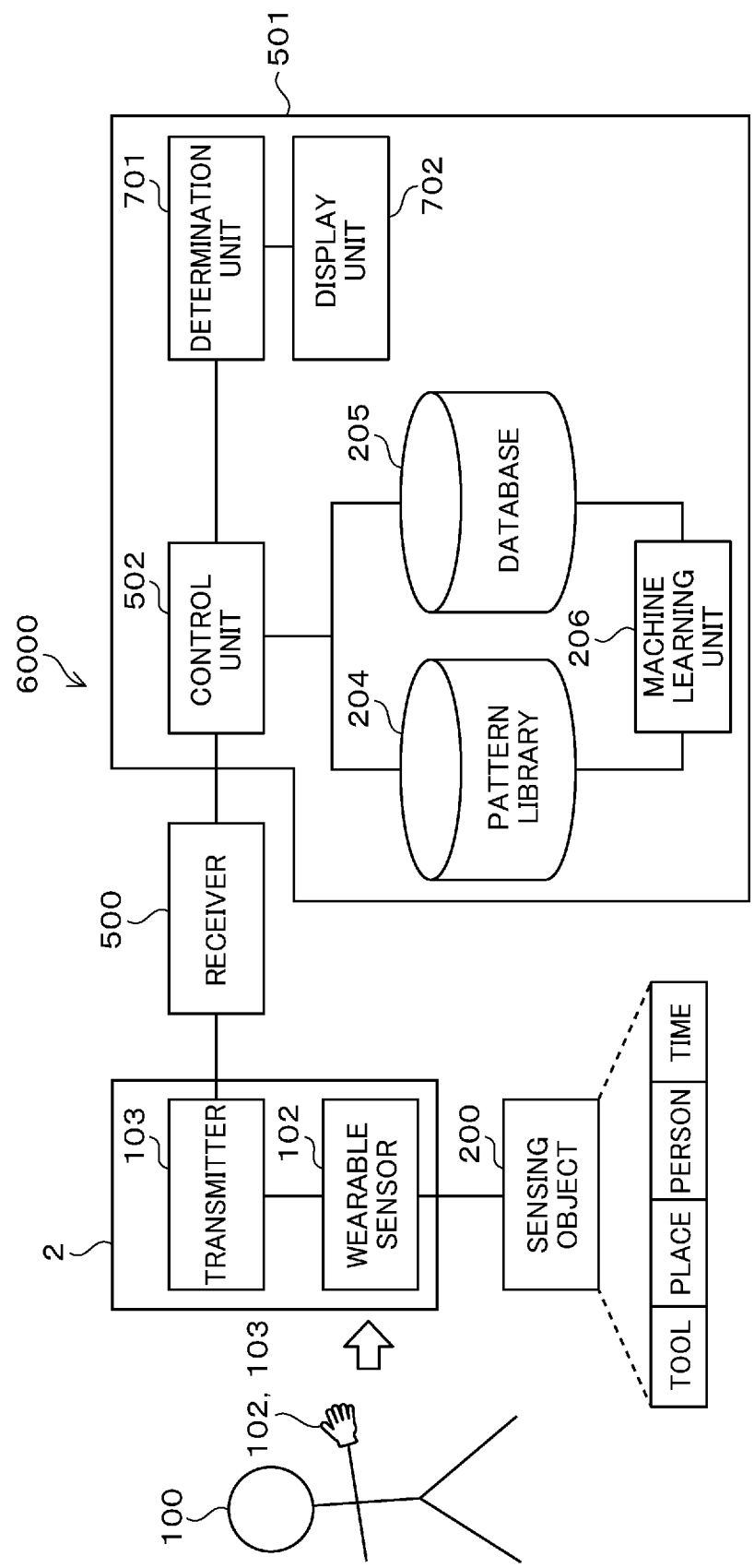
FIG. 9 shows a system configuration example of a work information management system including a wearable sensor and a function of executing data storage, an analysis, and a display by a single PC.

The sixth embodiment will be described with reference to FIG. 9. Similar to the fifth embodiment, a work information management system 6000 according to the sixth embodiment performs processing on the PC 501. On the other hand, similar to the case shown in FIG. 4, the determination unit 701 and the display unit 702 are provided in the PC 501. With such a configuration, the configuration of the sensor device 2 can be made compact. When processing capability of the sensor device 2 is low or in a small appliance in which no space is provided for display, a worker and work can be managed in the same manner as in the embodiments described above. Although the determination unit 701 and the display unit 702 are provided in the PC 501 in FIG. 9, the determination unit 701 and the display unit 702 may be provided in both the PC 501 and the sensor device 2 as shown in FIG. 7.

Seventh Embodiment

Figure 10:
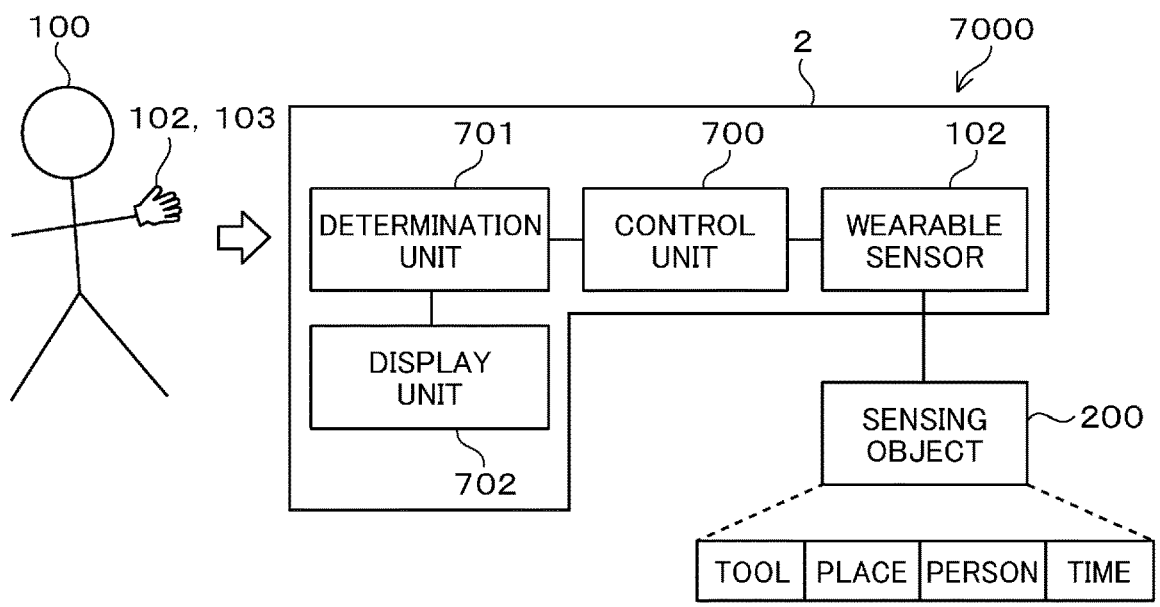
FIG. 10 shows a system configuration example of a work information management system that performs data shaping and result determination inside a wearable sensor.

The seventh embodiment will be described with reference to FIG. 10. In a work information management system 7000 according to the seventh embodiment, the control unit 700, the determination unit 701, and the display unit 702 that perform the same processing as the PC 501 are directly and wirelessly connected to the wearable sensor 102. The worker 100 wears the sensor device 2 having such a configuration to work. Accordingly, a worker can manage their own work using an electronic device smaller than electronic devices according to the fifth and sixth embodiments.

Eighth Embodiment

Figure 11:
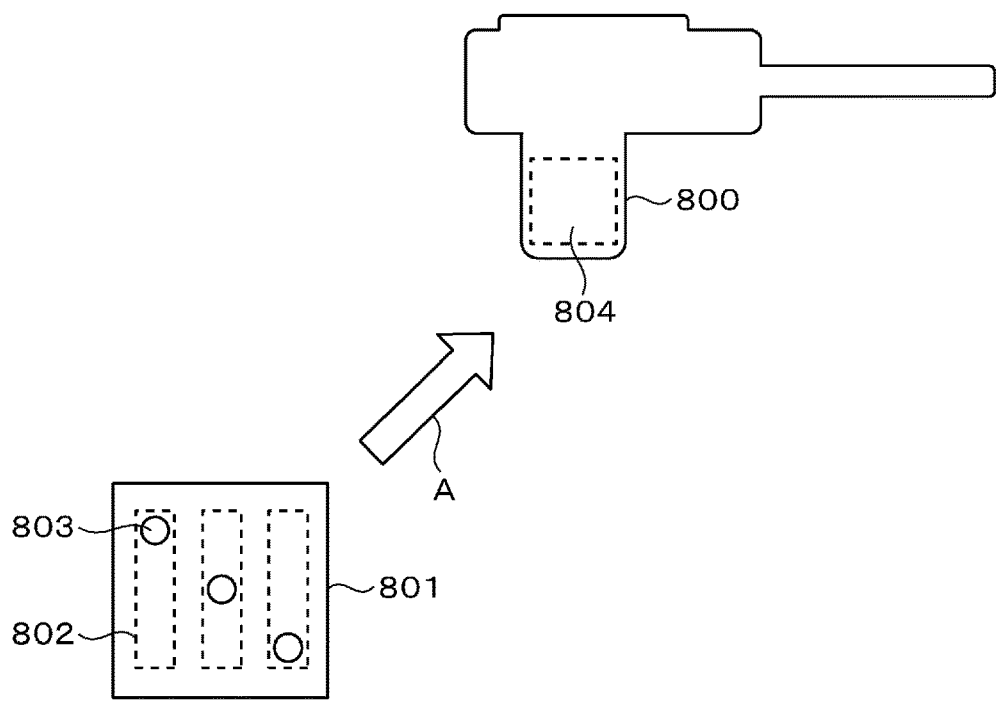
FIG. 11 shows an example of a sensing assistance attached to a sensing object by a wearable sensor.

The eighth embodiment will be described with reference to FIG. 11. The eighth embodiment relates to an assistance in acquiring data by the wearable sensor 102 of the sensor device 2 that is used in the work information management systems according to the first to seventh embodiments. A case in which the sensing object 101 is a tool is described as an example. When there are a plurality of tools having the same shape at a work site, it is difficult or impossible to use the method according to the seventh embodiment described above to determine which one of the plurality of tools the worker 100 has taken. A sensing assistance 801 is attached to a tool 800 serving as the sensing object 101 in the eighth embodiment so that it is possible to perform the determination. A position where the sensing assistance 801 is attached is at, for example, a handle position 804 of the tool 800 that imitates a electric screwdriver.

The sensing assistance 801 is formed of a rubber material, a plastic material, a metal material, or the like. Alternatively, the sensing assistance 801 is formed of a material that has a seal-shaped back surface and can be pasted to the tool 800. The sensing assistance 801 may be implemented by a member that can be detached from the wearable sensor 102 by a detachment member such as a stopper or Velcro (registered trademark).

The sensing assistance 801 is provided with concave-convex shaped protrusions 803 within a range of a predetermined position 802. When the worker 100 takes the tool 800 to which the sensing assistance 801 is attached (indicated by an arrow A in FIG. 11), parts of the wearable sensor 102 provided at positions corresponding to the protrusions 803 in the predetermined position 802 are pressed against the protrusions 803 to detect a position where the worker holds the tool 800, so that it is easy to determine which tool the worker 100 has taken.

For example, when the worker holds the sensor device 2 in hand, a sensor at each part of the wearable sensor 102 touches the sensing assistance 801 attached to the sensing object 101. Then, pressures of sensors (for example, three sensors including the index finger tip pressure sensor 1103 (ch 3), the middle finger tip pressure sensor 1106 (ch 6), and the ring finger tip pressure sensor 1110 (ch 9)) at parts corresponding to the protrusions 803 in the predetermined position 802 of the sensing assistance 801 are detected, and the IC chip of the wearable sensor 102 transmits information of these sensors to the terminal device 1. Sensor data at this time includes a sensor position corresponding to the protrusion 803 and a pressure value of the sensor in addition to the information shown in FIG. 5. For example, at a moment when the worker 100 holds a tool, a pressure of a pressure sensor provided in the glove-shaped wearable sensor increases in each channel. On the other hand, pressures of sensors (for example, the above-described three sensors) positioned corresponding to the protrusions 803 change particularly greatly. Therefore, similar to the first embodiment, the signal analyzing unit 105 of the terminal device 1 compares pressure values of sensors at these parts with a threshold. When a difference between the pressure values and the threshold is equal to or larger than a certain value, the signal analyzing unit 105 may display, for example, a value of the index finger base pressure sensor 1102 (ch 1) included in the sensor data received from the sensor device 2 and a position of the index finger base pressure sensor 1102 (ch 1) on the display unit 106, and present an advice message indicating a holding manner to the worker 100.

The sensing object 101 to which the sensing assistance 801 is attached is not limited to a tool. For example, the sensing assistance 801 may be pasted to a desk used in work or a wall at a work site in order to specify the work site. The sensing assistance 801 may be attached to the floor of a work site to specify the work site by a wearable sensor on a shoe sole. The number of the sensing assistance 801 is not limited to one, and a plurality of sensing assistances 801 may be pasted to one object to be pasted. The concave-convex shaped predetermined position 802 may entirely have a concave shape or a convex shape, and include the protrusions 803 in the range of the predetermined position 802. The predetermined position 802 is only a design index when the sensing assistance 801 is created. Instead of actually providing the sensing assistance 801, the predetermined position 802 may be directly designed on the sensing object 101 and have the same configuration with the sensing assistance 801. The protrusions 803 may have a round shape as shown in FIG. 8, or may have various shapes such as a square shape, a triangle shape, and a star shape.

As described above, the wearable sensor 102 receives, from the sensing object 101, sensor data obtained by touching the sensing assistance 801 attached to the sensing object 101 in the present embodiment. Accordingly, sensor data can be obtained from various sensing assistances 801 that can be attached to the sensing object 101.

The wearable sensor 102 receives, from the sensing object 101, sensor data obtained by touching the concave-convex shape provided in each sensing assistance 801. The server 3 identifies the sensing object 101 based on a sensor value obtained from the concave-convex shape included in the sensor data. For example, the sensing assistance 801 is attached to the sensing object 101, and a shape of the sensing assistance 801 is determined in advance corresponding to a place where the sensing object is placed, a type of the sensing object, and a user of the sensing object. The wearable sensor 102 touches the shape of the sensing assistance 801 so as to output sensor data of a touched part. A computer such as the server 3 and the PC 501 reads the sensor data, so that the place where the touched sensing object is placed, the type of the sensing object, and the user of the sensing object can be specified.

Since the wearable sensor 102 receives the sensor data from the sensing object 101 by pressing the concave-convex shape of the sensing assistance 801, the sensor data can be obtained by, for example, simply holding a tool by the worker.

Ninth Embodiment

Figure 12:
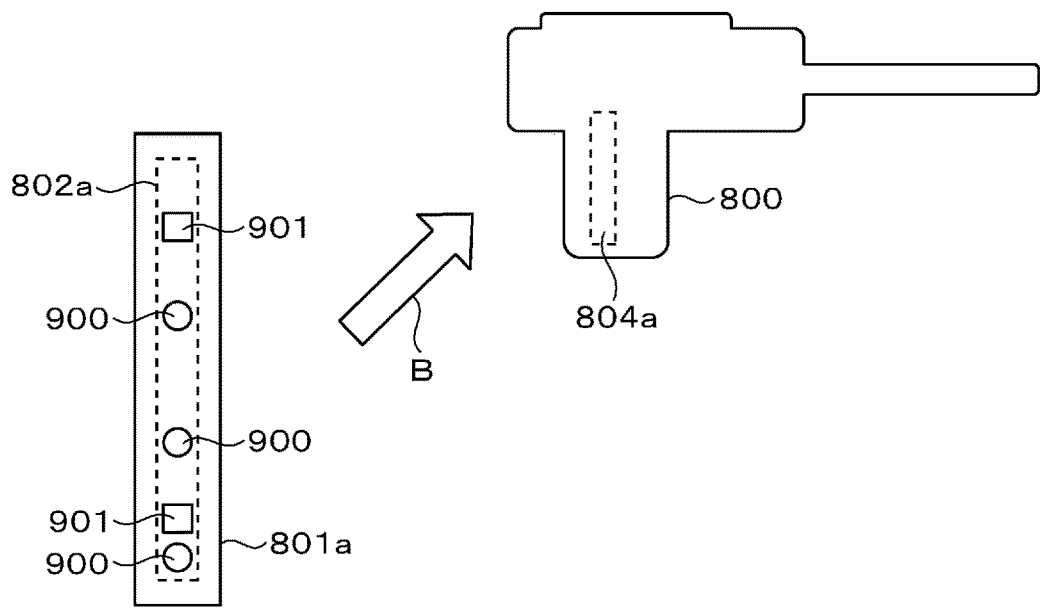
FIG. 12 shows an example of a sensing assistance that obtains identification information by tracing a body wearing a wearable sensor.

The ninth embodiment will be described with reference to FIG. 12. Similar to the eighth embodiment, the ninth embodiment relates to a sensing assistance. In a sensing assistance 801a according to the ninth embodiment, a concave-convex shaped predetermined range 802a that is read by the wearable sensor 102 has a long and narrow shape, and is provided with concave-convex shaped protrusions 900 and 901. Since the predetermined range 802a has a long and narrow shape, it is not possible to touch both the protrusion 900 and the protrusion 901 even when, for example, the wearable sensor 102 is pasted to a handle position 804a of the tool 800 and is held by the worker 100 in hand. According to the ninth embodiment, the worker 100 sequentially traces the long and narrow sensing assistance 801a attached to the tool 800 (as indicated by an arrow B in FIG. 12) with, for example, a finger wearing the wearable sensor 102, and an IC chip of the wearable sensor 102 reads the concave-convex shape. Specifically, similar to the eighth embodiment, when the IC chip of the wearable sensor 102 traces that the sensor device 2 is held by the worker in hand, sensors at each part of the wearable sensor 102 trace the sensing assistance 801a attached to the sensing object 101. Sensors (for example, the index finger tip pressure sensor 1103 (ch 3), the middle finger tip pressure sensor 1106 (ch 6), and the ring finger tip pressure sensor 1110 (ch 9)) at parts positioned corresponding to the protrusions 803 in the predetermined range 802a of the sensing assistance 801 detect pressures in order of the index finger tip pressure sensor 1103 (ch 3), the middle finger tip pressure sensor 1106 (ch 6), and the ring finger tip pressure sensor 1110 (ch 9).

The IC chip of the wearable sensor 102 transmits information to the terminal device 1. In addition to the information shown in FIG. 5, sensor data at this time includes a sensor position corresponding to the protrusion 803, a pressure value of a sensor, and a time point when a sensor at each part detects a pressure value. For example, when the worker 100 traces a tool, pressures of pressure sensors provided in the glove-shaped wearable sensor increase in each channel in a tracing order. On the other hand, pressures of sensors (for example, the above-described three sensors) positioned corresponding to the protrusions 803 change particularly greatly in the tracing order. Therefore, similar to the first embodiment, the signal analyzing unit 105 of the terminal device 1 compares the pressure values of sensors at these parts with a threshold. When a difference between the pressure values and the threshold is equal to or larger than a certain value, the signal analyzing unit 105 may display, for example, a value of the index finger base pressure sensor 1102 (ch 1) included in the sensor data received from the sensor device 2 and a position of the index finger base pressure sensor 1102 (ch 1) on the display unit 106, and present an advice message indicating a holding manner to the worker 100. The signal analyzing unit 105 reads a time point when these parts are traced and a correct order in which each predetermined part is traced, and determines whether each part is traced in the correct order. When the signal analyzing unit 105 determines that each part is not traced in the correct order, the signal analyzing unit 105 may present an advice message indicating a holding manner to the worker 100.

As described above, since the wearable sensor 102 receives the sensor data from the sensing object 101 by tracing the concave-convex shape of the sensing assistance 801a in the present embodiment, the sensor data can be obtained by simply tracing, with a finger even for a tool having a shape that cannot be held or the like.

Shapes of the protrusions 900 and 901 may include two types of a round shape and a square shape, and the shapes are not limited. The wearable sensor 102 may identify the sensing object 101 to which the sensing assistance 801a is pasted based on shapes of the protrusions, or an interval (an interval between positions or time) between a plurality of concave-convex shapes when the sensing object 101 is traced by a finger. For example, data in which the sensing object 101, the sensing assistance 801, and an arrangement of the protrusions provided in the sensing assistance 801 are associated with each other may be stored in a memory of the terminal device 1. The signal analyzing unit 105 may compare sensor data obtained from the wearable sensor 102 with the data to determine which sensing object 101 is traced.

In addition to a finger, a body that touches the sensing object 101 when the sensing object 101 is traced may be a palm, the back of a hand, an arm, a sole of a foot via a shoe sole, or the like. A length of the sensing assistance 801a can be set to any length and the number of protrusion shapes can be set to any number. More information is easily read by the wearable sensor by using the sensing assistance 801a having such a shape as compared with the eighth embodiment.

Tenth Embodiment

Figure 13:
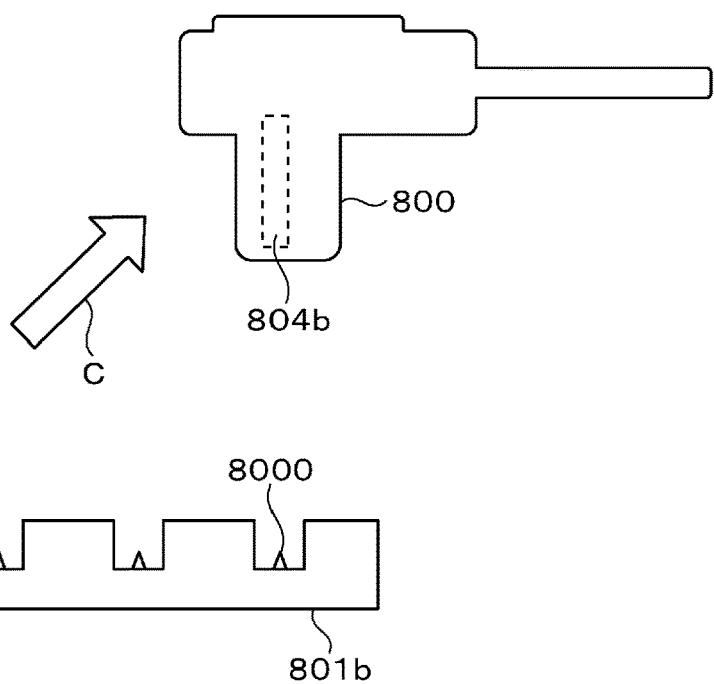
FIG. 13 shows an example of a sensing assistance having a devised shape so that a wearable sensor responds when being pressed by a body with a strength of a certain level or above.

The tenth embodiment will be described with reference to FIG. 13. Similar to the eighth and ninth embodiments, the tenth embodiment relates to a sensing assistance. FIG. 10 is a side cross-sectional view of a sensing assistance 801b according to the tenth embodiment. The sensing assistance 801b is provided with one or plural recesses P and a protrusion 8000 is provided at a bottom of each recess P. The sensing assistance 801b is formed of, for example, an elastic material such as rubber that contracts when the material is strongly pressed. For example, the sensing assistance 801b is pasted (as indicated by an arrow C in FIG. 13) to a handle 804b of the tool 800. When the worker 100 holds the tool 800 in hand and a holding force is weak, the hand wearing a wearable sensor does not touch the protrusion 8000. A force of a certain level or above is applied to the hand to compress the sensing assistance 801b and touch the protrusion shape 8000. With the sensing assistance 801b, a strength of holding a working object by a worker or a strength of a pressing force when a part of a body presses against the working object can be acquired with good sensitivity by the wearable sensor.

Eleventh Embodiment

Figure 14:
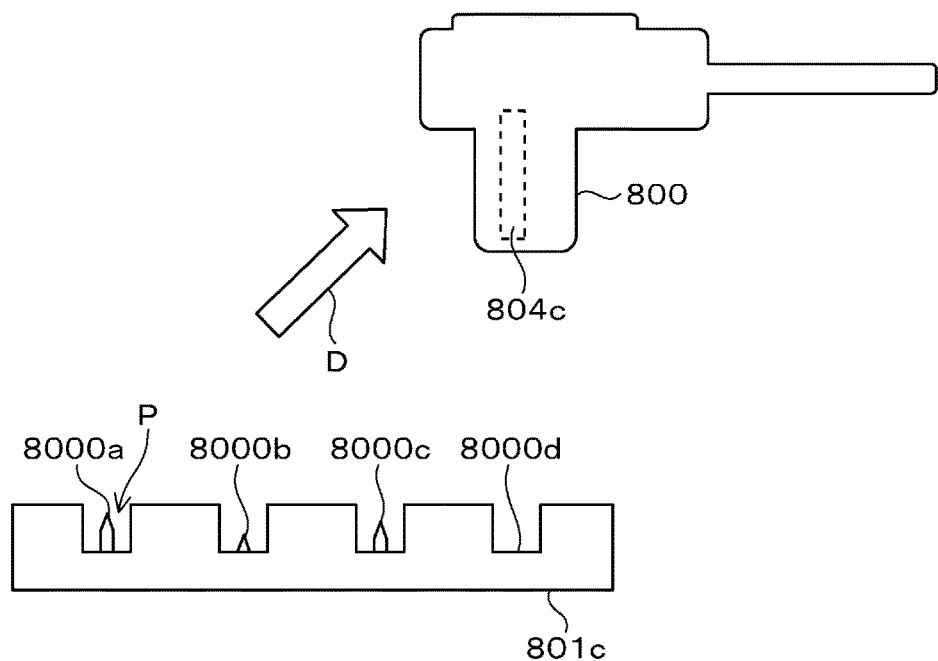
FIG. 14 shows an example of a sensing assistance having a devised shape so that a wearable sensor responds when being pressed by a body with different strengths corresponding to respective structures.

The eleventh embodiment will be described with reference to FIG. 14. Similar to the tenth embodiment, the eleventh embodiment relates to an object that acquires a pressing strength of a part of a body such as a hand. The eleventh embodiment is different from the tenth embodiment in that heights of protrusions 8000a, 8000b, 8000c, and 8000d in a sensing assistance 801c are different. A shape difference of the sensing assistance 801c may be a height difference of the protrusions, a depth difference of the recesses P, or a sharpness difference of tip corners of the protrusions. Alternatively, the shape difference of the sensing assistance 801c may be a width difference of the protrusions in a horizontal direction. The sensing assistance 801c is pasted (as indicated by an arrow D in FIG. 14) to a specified position 804c such as a handle of the tool 800, so that a wearable sensor can accurately determine a holding position of the tool when the worker 100 holds the tool.

Twelfth Embodiment

Figure 15:
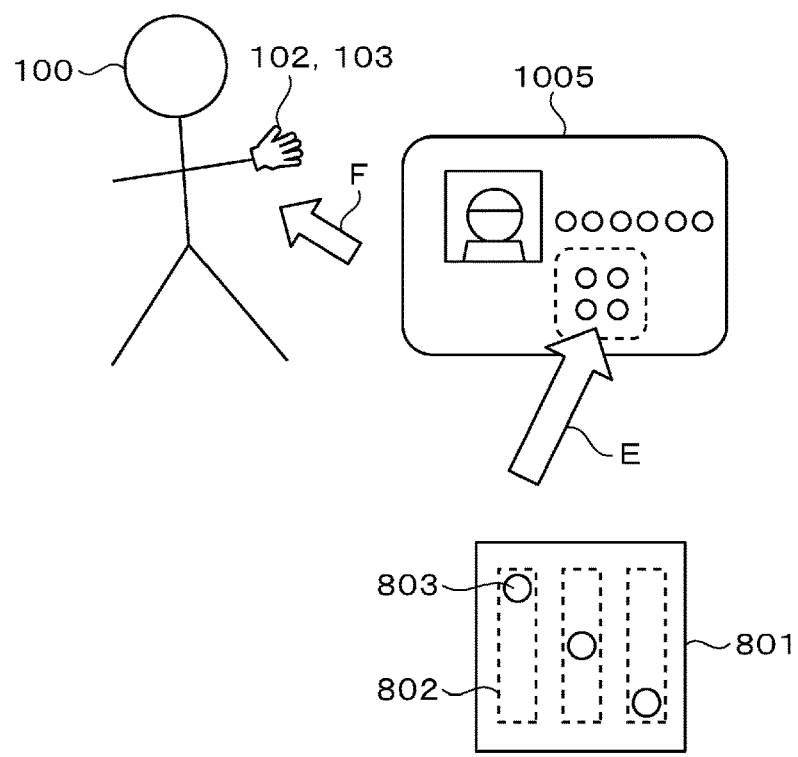
FIG. 15 shows an example of a sensing assistance that is devised so that the sensing assistance can be identified by a wearable sensor attached to a personal authentication card of a worker.

The twelfth embodiment will be described with reference to FIG. 15. The twelfth embodiment relates to a method for using the sensing assistance 801 according to the eighth to eleventh embodiments to identify the worker 100. According to the twelfth embodiment, the sensing assistance 801 according to the eighth to eleventh embodiments is attached (as indicated by an arrow E in FIG. 15) to an identification medium such as a personal identification ID card 1005 worn by the worker 100. When the worker 100 wears the sensor device 2 provided with the wearable sensor 102 at the time of starting work, at a first hour of starting work of a day, or the like, a part of a body touches the wearable sensor 102 of the sensor device 2 worn by the worker 100 at the sensing assistance 801 provided on the card 1005. Accordingly, worker information can be directly registered in the work information management system according to the first to seventh embodiments.

For example, the wearable sensor 102 of the sensor device 2 worn by the worker touches the sensing assistance 801 attached to the ID card 1005. The sensing assistance 801 includes the concave-convex shaped protrusions 803 within a range of the predetermined position 802. The protrusions 803 are provided at different positions for each worker. Therefore, an IC chip of the wearable sensor 102 reads a pattern indicating positions when the protrusions 803 are traced by the wearable sensor 102 and a time point when each protrusion is traced, and transmits such information to the terminal device 1 as sensor data. The signal analyzing unit 105 of the terminal device 1 compares a protrusion arrangement pattern stored in an identification table that is used for identifying a worker and is stored in the data storage unit 107 in advance with the pattern included in the sensor data.

In the identification table, the protrusion arrangement pattern is stored in association with a worker ID and a name of the worker. When the pattern included in the sensor data matches the protrusion arrangement pattern, the signal analyzing unit 105 determines that a worker corresponding to the protrusion arrangement pattern has started working, and outputs the determination result and a time point when each protrusion is traced to the display unit 106 as a work starting time point. The signal analyzing unit 105 stores work history data in which the worker ID and the work starting time point are associated with each other in the data storage unit 107 as worker information. Although the work starting time point is described above as an example, the same may be applied to a work ending time point.

REFERENCE SIGN LIST

1: terminal device
2: sensor device
1000, 2000, 3000, 4000, 5000, 6000, 7000: work information management system
100: worker
101: sensing object
102: wearable sensor
103: transmitter 104: receiver
105: signal analyzing unit
106, 106a, 106b, 106c: display unit
107: data storage unit
200: identification ID
201: IoT gateway
202: network
203: server
204: pattern library
205: database
206: machine learning unit
2071: NTP server
208, 208a, 208b, 208c: determination unit
300: camera
500: receiver
501: PC
502: control unit
700: control unit
800: tool
801, 801a, 801b, 801c: sensing assistance
803: protrusion
900, 901: concave-convex shaped protrusions
8000, 8000a, 8000b, 8000c, 8000d: protrusion
1005: personal identification ID card

The invention claimed is:

1. A work information management system comprising:
a glove-shaped wearable sensor including a plurality of pressure sensors for each finger portion of the glove-shaped wearable sensor individually receive sensor data from a sensing object;
a transmitter; and
a computer wirelessly coupled to the transmitter and coupled to a display,
wherein the transmitter wirelessly transmits the sensor data of each pressure sensor to the computer,
wherein the computer is configured to:
receive and store respective first sensor data of each of the pressure sensors as a result of a first worker gripping the sensing object,
receive and store respective second sensor data of each of the pressure sensors as a result of a second worker gripping the sensing object,
compare the first sensor data and the second sensor data for each pressure sensor respectively and determine whether there is a deviation greater than a predetermined value, and
upon determining there is a deviation greater than the predetermined value display, on the display, information indicating a correction of the grip of the second worker of gripping the sensing object,
wherein the wearable sensor receives, from the sensing object, the sensor data obtained by touching a concave-convex shape of a sensing assistance attached to the sensing object,
wherein the wearable sensor receives the sensor data from the sensing object by tracing the concave-convex shape of the sensing assistance, and
wherein computer identifies the sensing object based on a sensor value obtained by touching the concave-convex shape included in the sensor data.

2. The work information management system according to claim 1, wherein
the wearable sensor acquires, from the sensing object, work data including identification information of the sensing object, a location of the sensing object, and a time when the sensing object is operated, and transmits the acquired work data to the computer, and
wherein the computer is configured to determine what kind of work the second worker is performing and whether work being performed with the sensing object by the second worker satisfies a predetermined criterion.

3. The work information management system according to claim 2, wherein
the computer performs machine learning based on the first sensor data and work data and sets a result of the machine learning as a latest pattern library.

4. The work information management system according to claim 2, further comprising:
a camera that captures an image of the worker,
wherein the camera transmits, to the computer, image data in which the captured image of the worker, identification information indicating a location, and identification information of the camera are associated with each other, and
wherein the computer associates the work data with the image data based on the identification information indicating the location included in the image data received from the camera and the location of the sensing object included in the work data.

5. The work information management system according to claim 1, wherein
the wearable sensor receives the sensor data from the sensing object by pressing the concave-convex shape of the sensing assistance.

6. A work information management method of operating a work information management system, including: a glove-shaped wearable sensor, wherein the glove-shaped wearable sensor comprises a plurality of pressure sensors for each finger portion of the glove-shaped wearable sensor individually receive sensor data from a sensing object; a transmitter; and a computer wirelessly coupled to the transmitter and coupled to a display, the method comprising:
wirelessly transmitting, by the transmitter, the sensor data of each pressure sensor to the computer;
receiving and storing respective first sensor data of each of the pressure sensors as a result of a first worker gripping the sensing object;
receiving and storing respective second sensor data of each of the pressure sensors as a result of a second worker gripping the sensing object;
comparing the first sensor data and the second sensor data for each pressure sensor respectively and determine whether there is a deviation greater than a predetermined value; and
upon determining there is a deviation greater than the predetermined value displaying, on the display, information indicating a correction of the grip of the second worker of gripping the sensing object,
wherein the wearable sensor receives, from the sensing object, the sensor data obtained by touching a concave-convex shape of a sensing assistance attached to the sensing object,
wherein the wearable sensor receives the sensor data from the sensing object by tracing the concave-convex shape of the sensing assistance, and
wherein the method further comprises, identifying, by the computer, the sensing object based on a sensor value obtained by touching the concave-convex shape included in the sensor data.

* * * * *